United States Patent [19]

Smith

[11] 4,128,465

[45] Dec. 5, 1978

[54] ELECTRODIALYSIS OF PICKLE LIQUOR

[75] Inventor: Richard N. Smith, Monmouth Junction, N.J.

[73] Assignee: Sybron Corporation, Rochester, N.Y.

[21] Appl. No.: 877,113

[22] Filed: Feb. 13, 1978

[51] Int. Cl.² .......................................... B01D 13/02
[52] U.S. Cl. .............................. 204/180 P; 204/96; 204/301; 204/151
[58] Field of Search ............... 204/96, 112, 301, 151, 204/180 P

[56] References Cited

U.S. PATENT DOCUMENTS

| 3,347,761 | 10/1967 | Bicek | 204/151 |
| 3,761,369 | 9/1973 | Tirrell | 204/151 |
| 3,764,503 | 10/1973 | Lancy et al. | 204/151 X |
| 3,844,927 | 10/1974 | Smith | 204/301 |
| 3,969,207 | 7/1976 | Kerti et al. | 204/180 P |
| 4,071,431 | 1/1978 | Nicou et al. | 204/301 |

Primary Examiner—Arthur C. Prescott
Attorney, Agent, or Firm—Theodore B. Roessel; Papan Devnani

[57] ABSTRACT

The invention describes an electrodialytic (ED) process of converting soluble metal sulfates from a pickle liquor into insoluble metal oxides. The pickle liquor stream entering the pickle liquor chamber of ED apparatus under turbulent flow conditions is excited by acoustic energy causing the insoluble oxide to remain in suspension thus preventing the depositing of precipitate on the membrane and environs.

5 Claims, 2 Drawing Figures

ELECTRODIALYSIS OF PICKLE LIQUOR

BACKGROUND OF THE INVENTION

U.S. Pat. Nos. 3,394,068, 3,788,959 and 3,844,927 describe a method for electrodialytic, separation of mixtures, regeneration of acids containing metallic ions, and more particularly to a method for regenerating spent pickle liquor and recovering magnetic oxides and hydroxides of iron therefrom. The process as described in U.S. Pat. No. 3,788,959 utilizes an electrodialytic cell having an end anode chamber adapted to contain anolyte an anode having a surface in the anode chamber adapted to be in contact with the anolyte, an end cathode chamber adapted to contain catholyte, a cathode having a surface in the cathode chamber adapted to be in contact with the catholyte, a spent liquor chamber adapted to contain a spent liquor, such as, an acid containing metallic ions, and at least one concentrating chamber adapted to contain an electrolyte and disposed between the spent liquor chamber and the anode chamber, all of said chambers being separated from adjacent chambers by ion permeable membranes. The chambers are incorporated within a suitable frame and clamping means and means for imposing a difference in potential across the anode and cathode are provided as well as means for passing electrolytes, liquors and the like into, through and out of the respective chambers. When the chambers of the described apparatus contain the respective electrolytes, liquors or solutions, and a potential is provided across the electrodes, the process of the invention occurs. The acid is regenerated, recovered and concentrated in the anode and/or concentrating chambers, and the metallic ions form insoluble product or precipitate in the spent liquor chamber.

The electrodialytic process of said invention for treating spent liquors to separate metal values from acid values in said liquors comprises passing a first feed stream of spent liquor, into, through and out of a spent liquor chamber defined by a first and second ion permeable membrane, the first ion permeable membrane being an anion permselective membrane and the second ion permeable membrane being characterized by its ability to permit the migration of anions. A catholyte solution is circulated in the cathode chamber on the opposite side of the first ion permeable membrane. A second feed stream of an electrolyte solution is passed into, through and out of at least one concentrating chamber provided on the opposite side of the second ion permeable membrane. The concentrating chamber or chambers is defined by the second ion permeable membrane and a third ion permeable membrane. An anolyte solution is circulated in the anode chamber on the side of the third ion permeable membrane opposite the acid electrolyte solution. When a direct current is applied to the apparatus, regenerated and excess acid is recovered and concentrated in the acid concentrating chambers, and in certain embodiments of the invention, in the anode chamber. Metal values precipitate out in the spent liquor chamber and may be recovered externally in a suitable solids removal device. The catholyte electrode reaction generates hydroxyl ions that will neutralize free acid and then form substantially insoluble product when they migrate into the presence of hydrogen and then metallic ions in the spent liquor within the spent liquor chamber.

In accordance with said invention it is believed that anions in the spent liquor migrate into the electrolyte solution in the concentrating chamber and associate therein with cations having high mobility, such as, hydrogen ions, and when the cations having high mobility are hydrogen ions, an acid is formed in said electrolyte thereby enriching it with acid values. Anions from the catholyte migrate through the first ion permeable membrane into the spent liquor and there associate with hydrogen ions in the mixture when the mixture contains excess free acid. When hydrogen ions in the spent liquor associate with hydroxide ions which have migrated from the catholyte, they form water in the mixture. If the spent liquor contains no excess free acid or insufficient free acid to provide sufficient hydrogen ion to associate with the migrating catholyte anions, the migrating catholyte anions, generally OH-ions, form highly separable insoluble products with metal cations in the spent liquor.

A sequestrant is supplied to the catholyte solution to prevent the formation of insoluble compounds within the matrix of the anion permeable membrane which separates the catholyte solution from the spent liquor.

However in practicing this invention, at the onset of iron oxide formation at the initial stages iron oxides, probably magnetite, form in the cathode membrane surface in the pickle liquor chamber side, this finally leads to the formation of metallic iron on this membrane surface at the pickle liquor interface. This phenomenon causes membrane pore blockage and build up of high electrical resistance, resulting into non-operation (or stoppage) of the operation.

It has been further noted that as gross iron oxide and magnetite formation starts during the continued operation of the process the same membrane will be coated with these solids in spite of highest fluidization flow rates of the liquids through the pickle liquor (Henceforth abbreviated as PL) chamber. However, during this phase of the process, which continues until the practical limits of pickle liquor depletion is achieved, metallic iron is again formed but not on the catholyte PL membrane surface but on the surface of any iron oxide or magnetite sticking to the membrane surface on the anode side. The accumulation of the sticky iron oxide deposit causes increasing electrical resistance in that chamber. Probably the metallic iron formation starts when the resistance becomes high enough to induce reduction of $Fe++$ to Fe metal on the oxide surface facing the acid chamber. High resistance prevents passage of current through the process chambers causing the operation to decrease markedly.

Accordingly, it is an object of this invention to provide a process which would regenerate spent pickle liquor and recover magnetic oxides and oxides of iron therefrom without plugging or fouling the membrane or the pickle liquor chamber.

It is another object of this invention to provide an apparatus which would permit fluidized flow of the iron oxide formed so that it can be easily removed from the chamber for external separation.

This invention proposes to overcome these prior art problems by forcing the PL stream through the chamber at fluidization turbulent flow velocities by means which imparts vibration to the flowing streams and thence to a vibratable membrane (thin or pliable separating the PL and catholyte chambers). To promote high fluid flow velocities in the turbulent flow range the interior of the pickle liquor frame is specially formed to produce a tortuous path design. It has also been found that it is essential that additives such as certain chelating agents or sequestering compounds be added to the PL chamber rather than to catholyte as is known in the prior art. This addition of chelating agent in the pickle liquor stream eliminates the increase of unusual electrical resistance in the pickle liquor process. A complete understanding of the invention may be obtained from the following description and explanation which refer to the accompanying drawing, illustrating an embodiment for spent pickle liquor regeneration.

DRAWINGS

DESCRIPTION OF THE PREFERRED EMBODIMENTS

Figure 1:
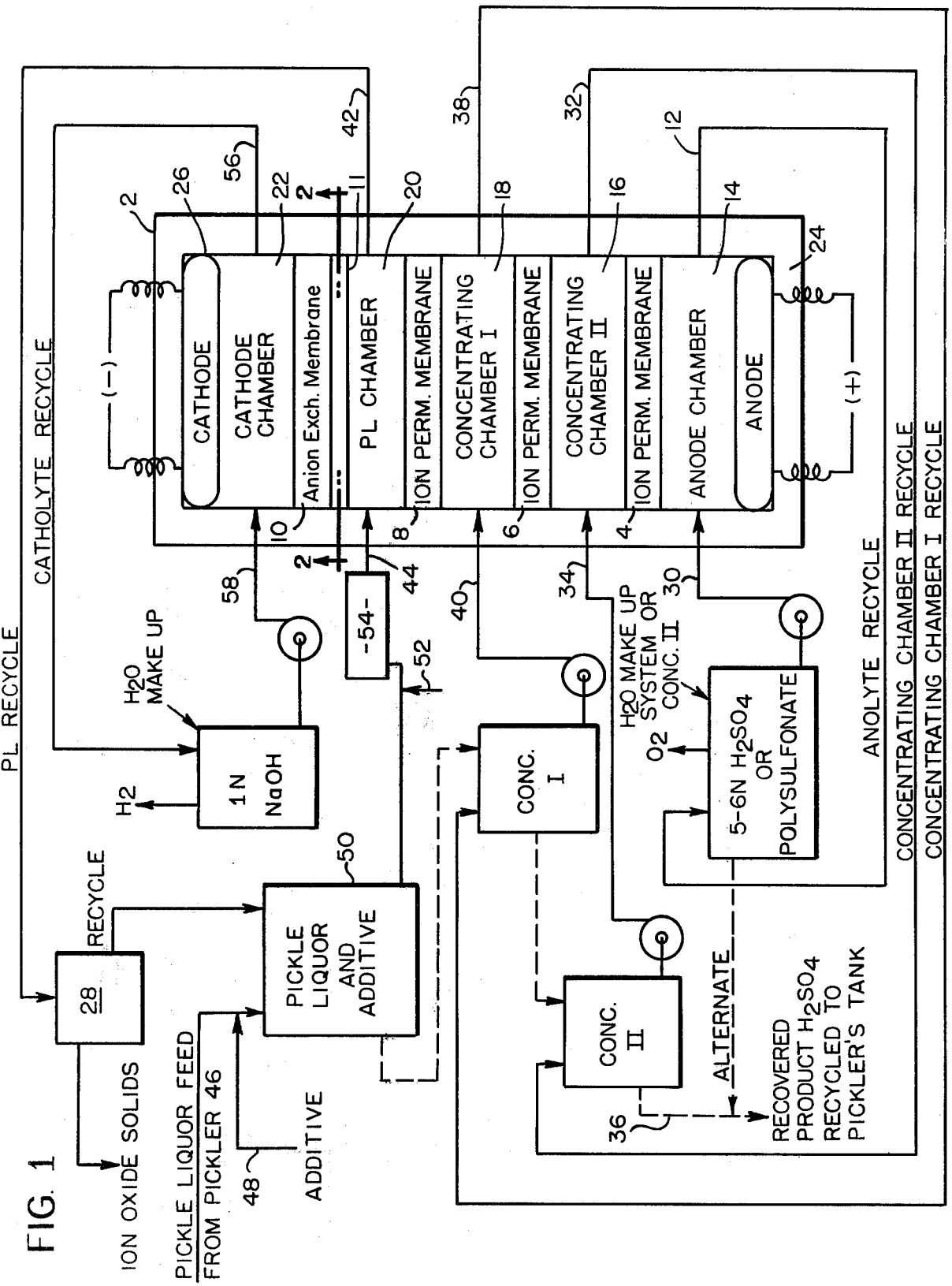
FIG. 1 is a diagrammatic cross-sectional representation of a multi-chambered electrodialytic apparatus used to practice the present invention.
Figure 2:
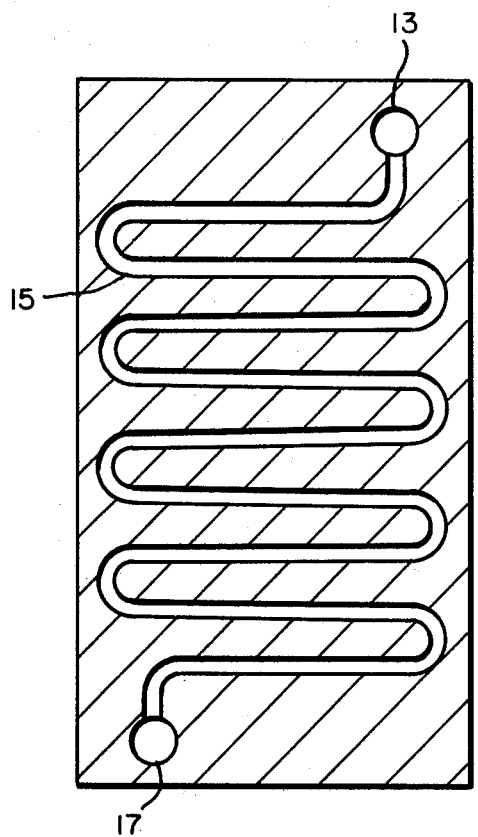
FIG. 2 is a cross-section view of a frame causing tortuous flow path taken along lines 2—2 of FIG. 1.

Referring to FIG. 1 there is shown a conventional acid and alkali resistant electrodialytic apparatus 2 divided into chambers 14, 16, 18, 20 and 22, said chambers being separated from each other by ion permeable membranes 4, 6, 8, and 10 respectively. Suitable frames and other materials of construction (not shown) well known in the art for defining chambers and assembling electrodialytic apparatuses may be used.

Between anion exchange membrane 10 and the cathode is positioned an open mesh plastic screen which serves several functions, i.e., its open mesh forces flow of cathode rinse to fully fill the cathode chamber via a sheet-flow characteristic while permitting ready movement of the hydroxyl ions formed electrically at the cathode to move through the alkaline rinse thus carrying the DC current to the surface of the first anion exchange membrane 10, therethrough into the pickle liquor chamber stream. Additionally, the screen mesh serves to push said membrane against the PL tortuous path frame to force that fluid to flow along the defined tortuous path and thereby minimizing the possibility of the PL stream by-passing portions of the defined flow path allowing portions of the path to be deficient in a vigorously flowing rinse stream. Similarly, the other face of the tortuous path PL frame has the ion permeable membrane, on that side pushed oppositely against the PL frame to keep the PL rinse fluid flowing exclusively through the tortuous path assuming full flow conditions therein. The other membrane defined chambers containing screen mesh separation from the anode electrode to the PL chamber all serve to force the ion selective membrane 8 against the PL frame to form the second hydraulic face for the tortuous path in the PL chamber.

In the embodiments of the invention shown in FIG. 1 ion permeable membranes 4, 6, 8 and 10 are anion permeable membranes. Chamber 14 is an anode chamber by virtue of anode positioned therein. Chamber 22 is a cathode chamber by virtue of cathode 26 positioned therein. Pickle liquor chamber 20 is the chamber adjacent cathode chamber 22 and separated from cathode chamber 22 by anion permselective membrane 10. Two concentrating chambers designated as concentrating chamber I or first concentrating chamber and represented by numeral 18 and concentrating chamber II or second concentrating chamber designated by numeral 16 are disposed between anode chamber 14 and pickle liquor chamber 20. Concentrating chamber I is defined by ion permeable membrane 8 and ion permeable membrane 6. Concentrating chamber II is defined by ion permeable membrane 6 and ion permeable membrane 4. As with the case of membrane 8 and membrane 4, membrane 6 may be any membrane or barrier which will permit migration of anions therethrough. Anode 24 and cathode 26 are connected to a suitable source of direct current (not shown). A solids removal device designated by numeral 28 is schematically shown.

Each chamber is provided with inlet and outlet means. Anode chamber 14 is provided with outlet 12 and inlet 30 for circulating anolyte within the chamber. Outlet 32 and inlet 34 connected by a suitable conduit are used for the circulation of electrolyte with concentrating chamber 16. Conduit 36 is provided for the removal of recovered $H_2SO_4$ product. Outlet 38 and inlet 40 connected by a suitable conduit are used for the circulation of electrolyte within concentrating chamber 18. Outlet 42 and inlet 44 are used for the circulation of liquor within spent liquor chamber 20 and said lines are operatively connected with solids removal device 28 by means of suitable conduits. Conduit 46 provides spent pickle liquor feed to the system and conduit 48 provides chelating agent to maintain a concentration in said pickle liquor feed when needed. 50 is a surge tank for pickle liquor chelating agent mix. Conduit 52 provides gas such as air to the pickle liquor feed and 54 is the means to pulsate or vibrate the feed before entering the pickle liquor chamber 20 via conduit 44. Outlet 56 and inlet 58 are provided for the circulation of catholyte within catholyte chamber 22.

In the operation of the above described apparatus in accordance with the process of the present invention for the regeneration of spent pickle liquor, said liquor along with a chelating agent is circulated in chamber 20 while an aqueous solution of sulfuric acid enriched concentration chamber electrolyte from "lean" pickle liquor is circulated within anode chamber 14; an aqueous catholyte solution, preferably an alkali metal hydroxide is circulated within cathode chamber 22; and an electrolyte, preferably an aqueous solution of sulfuric acid or "lean" pickle liquor is circulated within first concentrating chamber 18. "Lean" pickle liquor as used herein is spent pickle liquor from which the free acid and the bulk of the iron has been removed by previous treatment, such as, the effluent liquor from spent liquor chamber 20 of the operating electrodialytic apparatus described herein. The effluent from first concentrating chamber 18 flows from outlet 38 into inlet 34 where it becomes the influent of second concentrating chamber 16.

In the embodiment of this invention represented in FIG. 1 a closed loop system of a five chambered cell is used for concentrating, regenerating and recovering sulfuric acid from a pickle liquor stream. A sulfuric acid pickle liquor stream used to clean iron and steel products and containing metal ions is circulated in chamber 20. The catholyte in chamber 22 is preferably an aqueous sodium hydroxide solution (1N) and the anolyte in chamber 14 is preferably an aqueous sulfuric acid solution. Various streams circulate in their respective chambers via pump and conduits. A direct current of electricity is passed through the cell by means of anode 24 and cathode 26 thus causing cations and anions within the chambers to migrate toward the cathode and anode respectively. Current flow causes two directions of ions flow to occur in solution. Sulfate and hydroxyl anions move toward anode and hydrogen and iron cations in PL chamber move toward cathode. The electrical neutrality is maintained at all times. Within anode chamber 14 which contains dilute sulfuric acid hydrogen ions are formed, $$H_2O \rightarrow 2H^+ + \tfrac{1}{2}O_2 + 2e$$

and migrate toward cathode 26 until they meet anion permeable membrane 4 which normally prevents the migration of cations therethrough. However, a substantial portion of the hydrogen ions formed at anode 24 and migrating toward cathode 26 leak through the anion permeable membrane 4. These migrating hydrogen ions have a high mobility and enter second concentrating chamber 16 where they are incorporated into the acid electrolyte solution therein and enrich the electrolyte with hydrogen ions. Similarly, some hydrogen ions in second concentrating chamber 16 will also migrate toward the cathode and enter first concentrating chamber 1 where they are incorporated into the acid electrolyte therein and enrich the electrolyte with hydrogen ions. Likewise, some hydrogen ions from the first concentrating chamber tend to leak slowly into spent PL chamber 20 which contains spent pickle liquor comprising principally iron cations, hydrogen cations and sulfate anions. Within spent liquor chamber 20 which contains spent pickle liquor comprising principally iron cations, hydrogen cations and sulfate anions, the sulfate anions $SO_4^{-2}$ migrate toward anode 24 and since membrane 8 is anion permeable the sulfate anions pass through said membrane barrier into first concentrating chamber 18 thereby increasing the overall concentration of sulfate ions within the aqueous acid electrolyte solution circulating in first concentrating chamber 18. The hydrogen ions present in said chamber and those leaking into it from second concentrating chamber with the migrating sulfate anions in chamber 18 form sulfuric acid.

The electrolyte in the second concentrating chamber similarly becomes enriched with sulfuric acid. Except for the highly mobile hydrogen ions, some of which may pass through anion permeable membrane 10 cations formed within spent liquor chamber 20 are met by anion permeable membrane 10 in their attempt to migrate toward cathode 26 and are also repelled thereby and substantially confined to chamber 20. Within cathode chamber 22 containing aqueous alkaline catholyte, preferably an aqueous alkali metal hydroxide such as sodium hydroxide or potassium hydroxide, hydroxyl anions are formed at the cathode 26 and migrate toward anode 24 passing through anion permable membrane 10 into the tortuous path pickle liquor chamber 20. The following reaction is believed to take place at the cathode to produce the hydroxyl ions:

$$2H_2O + 2e \rightarrow 2OH^- + H_2$$

After the free acid has been essentially removed from the PL, the net effect of the operative natural ion migration coupled with the anion permselective barrier between chambers 22 and 20 is the meeting of the iron cations and hydroxyl anions within chamber 20, whereupon iron hydroxides and/or oxides are formed and are precipitated within chamber 20. The precipitated solids along with circulating solutions are then carried from outlet 42 to solids removal device 28 and removed as high purity magnetite which is easily removed. Sulfate anions which migrate from first concentrating chamber migrate through membrane 6 reach second concentrating chamber 16 and which remain unassociated with cations in the electrolyte solution contained in second concentrating chamber 16 pass through ion permeable membrane 4 and enter anode chamber 14 where they can associate with hydrogen ion formed at anode 24 and migrating in the direction of cathode 26. In this manner, sulfuric acid is also formed in anode chamber 14 and thereby becomes a part of the anolyte solution. Thus, in accordance with the present invention sulfuric acid is formed in concentrating chambers 18, 16 and the respective electrolyte and anolyte therein becomes enriched with the sulfuric acid. Thus in the circulation scheme described according to this process, the liquor effluent from spent liquor chamber 20 which passes through conduit 42 to solids removal device 28 and exits therefrom depleted in acid and iron value and depleted in sulfate content becomes enriched with sulfuric acid in first concentrating chamber 18 in second concentrating chamber 16 and finally in anode chamber 14 where it reaches its maximum sulfuric acid concentration.

Though the electromembrane process described herein efficiently processes pickle liquor it could easily be used to convert soluble sulfates into insoluble oxides.

Though Chelon 80 (Regd. TM of Stauffer Chemical Co.) which is a pentasodium diethylene triamine pentaacetate solution was used as a chelating additive throughout these examples, the process is not limited to that and many other suitable compounds such as disodium diethylene triamine penta acetate, ethylenediamine tetraacetate, and the like also work effectively.

Pickle liquor stream entering the chamber 20 could be fluidized by various means (54). For instance a device such as Vanton Pump (Regd. TM of Vanton Pump and Equipment Corp.) could be used. This device accomplishes pumping by a rotor mounted on an eccentric shaft which rotates within a liner creating a progressive squeegee action on the fluid trapped between the liner and the body block. This pumping action is analogous to the "milking" of a tube filled with liquid. The PL is discharged by such pump as a pulsating flow which maintains vibration in the fluid in PL chamber. The pulse generating device delivers vibrating flowing stream in the low sonic fundamental frequency range of a few Hz to 50 Hz. The low frequency range, has an added advantage in that the attenuation losses within the chamber are minimum—promoting the transport of this signal throughout the chamber. The amplitude of the pulse cycle should be as great as practical even from a maximum positive to a brief negative value at the high pressure end. In addition, a gas, such as air, injected into Vanton pump suction causes a sharp acoustic pressure spike (500+ psi) to be injected into cell assembly once every pump revolution (20 or 30 times a second, depending upon motor speed). This pressure spike has two beneficial effects. The fluid within the chamber appears to be excited to cavitation by the pulse and the structure is also jarred causing a mechanical reverberation throughout the cell assembly. The gas introduced in the suction feed to the pump generates the cavitation pressure pulse caused by the acoustic energy.

The pressure pulse could also be generated by a variable alternating flow motor driven or oscillating modulating valve. The stroke capability of such acoustic device is such that selected amplitudes would create pressure pulses whose frequency content would be predominantly at the fundamental from the rotation speed and where increasing strokes could create increasing intensity pulsation with larger amplitudes. Thus, a wide range of acoustic excitation could be obtained. The invention is not limited to a specific device and any means which cause low frequency pulse in the PL stream entering PL chamber could be used, but especially in the range of a few to 50 Hz.

To promote high fluid turbulent flow velocities the interior of the pickle liquor frame is specially formed to produce a tortuous path design. This is accomplished in part by providing a flow chamber thinner than the chamber flange frame. The following elements are essential to form the tortuous path design. (1) a chamfered edge, preferably on the flat steel cathode face so that the full face protrudes into the depth of the PL chamber (2) the adjacent pickle liquor frame to reduce its interior thickness (compared to its flange frame thickness) by at least the amount of the chamfer, (3) the interior of the pickle liquor frame is formed to produce a tortuous path design to promote high fluid-flow turbulent velocities, (4) the main members within said PL frame physically hydraulically matched with the counter chamfers to define close clearances on the faces of both the chamber and the chamfer to avoid fluid by-pass. The next adjacent chamber will be essentially flat as defined by its frame and the turbulance promoting screen mesh for sheet-type, hydraulic flow distribution within that and subsequent chambers. The caustic cathode chamber is also the sheet-flow type with a turbulance promoting screen mesh filling inside the cathode frame and over the cathode electrode face. Membranes divide and form the hydraulic barrier between all chambers.

During the development study of the effect of the parameters in the insoluble oxide formation process and particularly in the pickle liquor (PL) chamber where this process occurs, two factors become obvious. To permit adequate porting for the requisite fluid/solids flow without plugging because of the presence of suspended solids (insoluble oxides) it is essential in the preferred design that the flange area where the stream entered and exited from the chamber have a thickness of at least in the order of $\frac{1}{8}$ inch (0.125 inch).

It is also found that this same PL chamber fluid flow should be of minimum thickness to reduce the electrical resistance of this chamber in the electrical operation of an electromembrane process. As more of the solubles were removed from solution by the chemical reactions ($FeSO_4 + 20H^- \rightarrow FeO + *SO_4$) or ($H_2SO_4 + 20H \rightarrow 2H_2O + *SO_4$) *(moves out of the chamber toward the anode thereby sharply increasing the electrical resistance of the fluid in the chamber), the electrical resistance would become progressively higher, easily increasing by more than an order of magnitude. By maintaining the thinnest chamber possible, the overall effect of the progressively increasing resistance of this chamber on the total stack ED (electrodialysis) power requirements is minimized.

For optimum results it is necessary to provide a uniform but gradual taper for creating the protrusion into the PL chamber.

To accomplish this, a chamfer is provided in an adjacent frame, the end block (cathode frame) of the electromembrane stack. Alternately, the chamfer could be in the edges of the metal cathode itself. The chamfer could be of any desired depth (the total PL frame thickness would be approximately 0.125 inch). This would accomplish a reduction of the PL chamber thickness to the extent of the chamfer. Thus a 0.060 inch chamfer along $\frac{1}{8}$ inch of the cathode edge would protrude into an open PL cell working area to the extent of 0.060 inch leaving a PL flow cell thickness of 0.050.

In the case of a tortuous path flow in the PL chamber, additional provisions had to be included to obtain the concomitant decrease of thickness in the liquid flow path of the chamber. To do this the frame was assembled with the matching chamfer to seal the edge of the chamfer in the cathode edge to stop PL by-passing.

While the invention has been described in connection with specific embodiments thereof, it will be understood that it is capable of further modification and this application is intended to cover any variation, uses or adaptation of the invention. It will, therefore, be recognized that the invention is not to be considered as limited to the precise embodiments shown and described but is to be interpreted as broadly as permitted by the appended claims:

I claim:

1. In an electrodialytic process for converting a soluble metal sulfate into an insoluble metal oxide or hydroxides and recovering such from a fluid medium comprising the following steps:
    (a) circulating said mixture with an additive between spaced ion permeable membrane;
    (b) circulating caustic soda as first electrolyte in the catholyte chamber;
    (c) circulating sulfuric acid as second electrolyte in the anode chamber;
    (d) passing a direct current through said electrolyte and said mixtures whereby metal sulfate is precipitated as an oxide.

2. The process of claim 1 wherein the additive is pentasodiumdiethylene triamine pentaacetate solution.

3. The process of claim 1 wherein the metal salt and its acid are circulated with pulsation.

4. The process of claim 1 wherein such pulsation is caused by acoustic energy means.

5. The process of claim 4 wherein a gas is injected in the suction of acoustic energy means.

* * * * *